United States Patent
Calanca et al.

(10) Patent No.: US 9,121,525 B2
(45) Date of Patent: Sep. 1, 2015

(54) MICRO-FLUIDIC SYSTEM

(75) Inventors: Alex Calanca, Bologna (IT); Gerardo Perozziello, Bologna (IT); Gianni Medoro, Casalecchio Di Reno (IT)

(73) Assignee: SILICON BIOSYSTEMS S.P.A., Bologna (IT)

( * ) Notice: Subject to any disclaimer, the term of this patent is extended or adjusted under 35 U.S.C. 154(b) by 702 days.

(21) Appl. No.: 13/515,980

(22) PCT Filed: Dec. 16, 2010

(86) PCT No.: PCT/IB2010/003281
§ 371 (c)(1),
(2), (4) Date: Sep. 14, 2012

(87) PCT Pub. No.: WO2011/073785
PCT Pub. Date: Jun. 23, 2011

(65) Prior Publication Data
US 2013/0042936 A1  Feb. 21, 2013

(30) Foreign Application Priority Data
Dec. 17, 2009 (IT) .............................. BO2009A0807

(51) Int. Cl.
*F16K 31/00* (2006.01)
*F16K 99/00* (2006.01)

(52) U.S. Cl.
CPC .......... *F16K 99/0001* (2013.01); *F16K 99/0015* (2013.01); *F16K 99/0059* (2013.01); *F16K 2099/0074* (2013.01); *Y10T 137/9247* (2015.04)

(58) Field of Classification Search
CPC ............ F16K 99/0001; F16K 99/0015; F16K 99/0059; F16K 2099/0074; Y10T 137/9247

USPC ............ 251/129.06, 61.1, 11; 422/68.1, 417, 422/502, 503, 537
See application file for complete search history.

(56) References Cited

U.S. PATENT DOCUMENTS

| 6,293,012 | B1 | 9/2001 | Moles | |
|---|---|---|---|---|
| 7,438,030 | B1* | 10/2008 | Okojie | 123/90.11 |
| 2001/0029983 | A1* | 10/2001 | Unger et al. | 137/597 |
| 2004/0209354 | A1* | 10/2004 | Mathies et al. | 435/287.2 |
| 2005/0153430 | A1* | 7/2005 | Ohtaka | 435/287.2 |
| 2007/0200081 | A1* | 8/2007 | Elizarov et al. | 251/331 |

(Continued)

FOREIGN PATENT DOCUMENTS

| WO | WO-2004/061085 A2 | 7/2004 |
|---|---|---|
| WO | WO-2008/115626 A2 | 9/2008 |

OTHER PUBLICATIONS

Shoji, S., et al., "Smallest Dead Volume Microvalves for Integrated Chemical Analyzing Systems," In Proceedings, Transducers '91 (1991 International Conference on Solid State Sensors and Actuators), IEEE Press, NJ, 1991, pp. 1052-1055.

*Primary Examiner* — Marina Tietjen
*Assistant Examiner* — Umashankar Venkatesan
(74) *Attorney, Agent, or Firm* — Marshall, Gerstein & Borun LLP

(57) ABSTRACT

A micro-fluidic system comprising a micro-fluidic channel, which has a wall provided with a hole; and a closing element, which is adapted to cooperate with a partition arranged within the micro-fluidic channel in the area of the hole to isolate or connect two segments of the channel; the closing element is made of a photoresist material, in particular a material obtained by the polymerisation of a photopolymerable material.

17 Claims, 3 Drawing Sheets

(56) References Cited

U.S. PATENT DOCUMENTS

2010/0303687 A1* 12/2010 Blaga et al. .................. 422/504
2011/0305607 A1* 12/2011 Jung et al. .................... 422/502
2012/0006681 A1* 1/2012 Kaler et al. ................... 204/453
2013/0032235 A1* 2/2013 Johnstone et al. ............ 137/833
2013/0186078 A1* 7/2013 Lemke et al. .................. 60/325

* cited by examiner

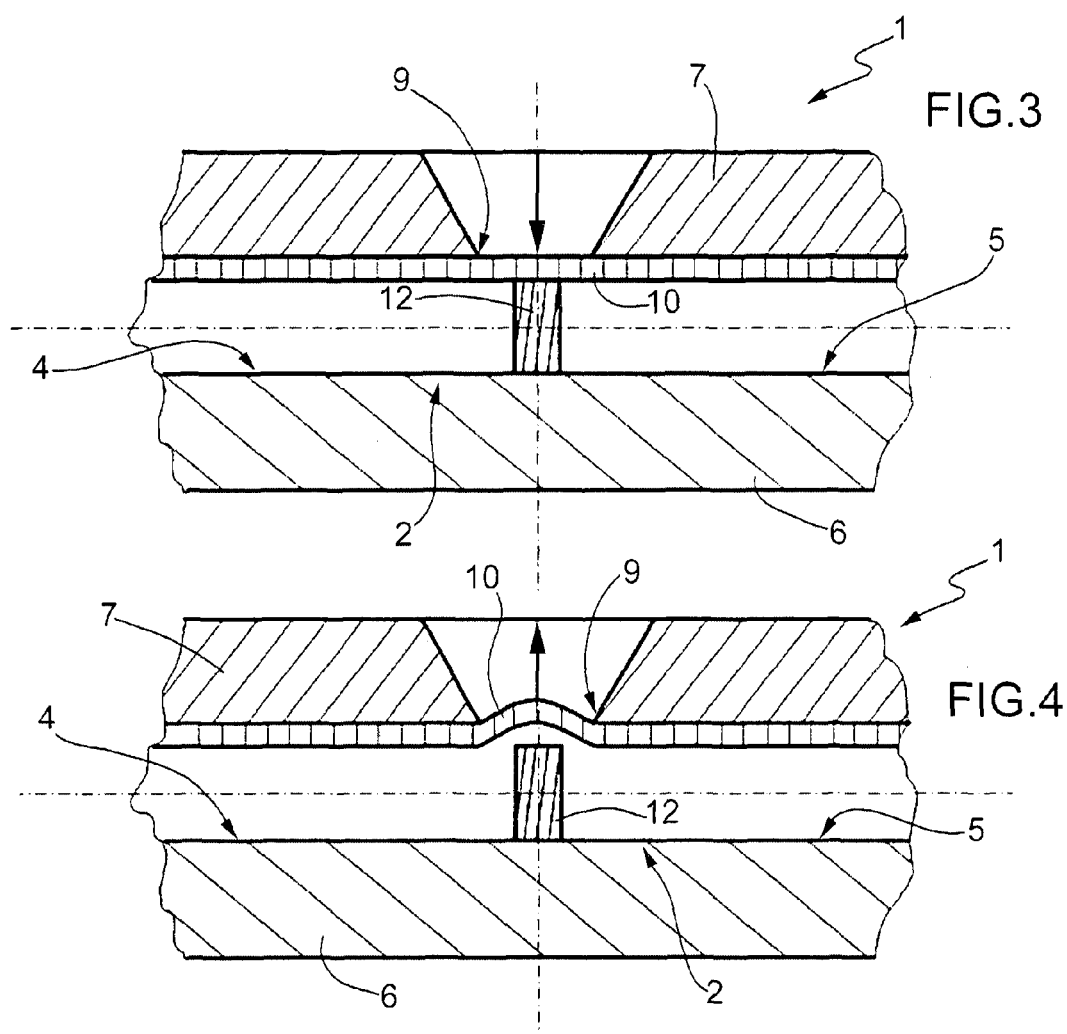

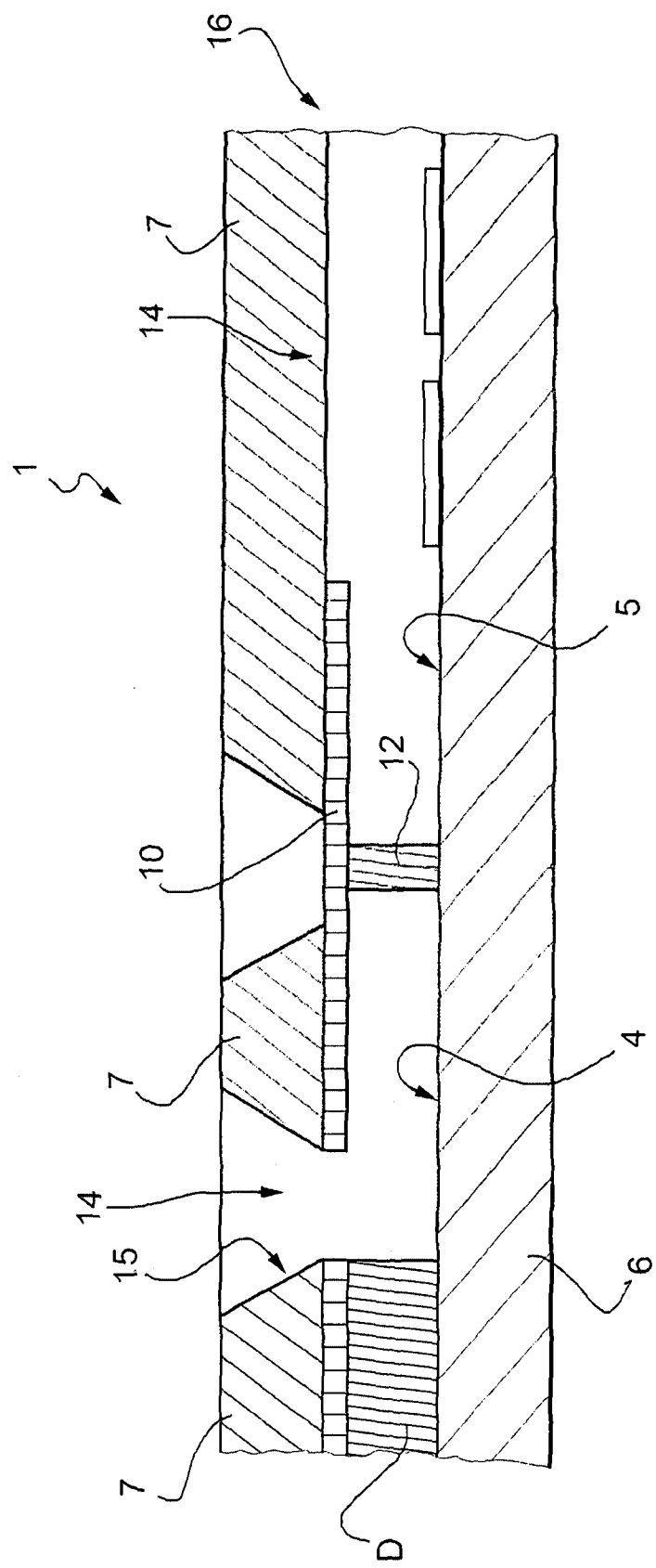

MICRO-FLUIDIC SYSTEM

CROSS-REFERENCE TO RELATED APPLICATIONS

This application is the U.S. national phase of International Application No. PCT/IB2010/003281, filed Dec. 16, 2010, which claims the benefit of Italian Patent Application No. BO2009A 000807, filed Dec. 17, 2009.

TECHNICAL FIELD

The present invention relates to a microfluidic system and to a process for the production thereof.

BACKGROUND ART

In the micro-fluidic field there is known a type of system comprising a channel, which includes two segments connected to one another by a valve. The valve usually includes a partition arranged along the channel to separate the two segments and a membrane of an elastomeric material connected to a wall of the channel in the area of two holes, each of which is arranged at an end of a respective segment in the area of the partition. The valve further comprises a pneumatic actuator, which is adapted: on one side, to create a depression so as to deform the valve and, therefore, connect the two segments of the channel; on the other side, to exert a pressure to push the membrane against the wall of the channel so as to close the two holes and isolate the two segments.

Known valves and circuits of the above indicated type are for example disclosed in WO2008115626 (see in particular FIG. 2) and in WO2004061085 (see in particular FIGS. 1A-1E). It should be noted that WO2004061085 discloses only one element made of elastomeric material (indicated by numerals 11 and 157 in FIGS. 1B-1E).

The paper by the title "Smallest dead volume microvalves for integrated chemical analyzing systems" (ISBN: 978-0-87942-585-2) discloses a valve with a single photoresist membrane.

The valves of the state of the art have considerable disadvantages.

A first series of drawbacks results from the fact that the preparation of this kind of valves is often complex. In particular, it should be noted that it is often necessary (although difficult) to selectively connect the membrane to the wall of the channel and not to the partition. Drawbacks are also associated to the complexity of producing several parts of the micro-fluidic system independently of one another.

Furthermore, valves of the above disclosed type are often relatively bulky and may not be incorporated in complex microfluidic circuits, but instead must be arranged externally and connected to microfluidic circuits by means of relatively long channels.

DISCLOSURE OF INVENTION

It is an object of the present invention to provide a microfluidic system and a process for its production, which allow to overcome, at least partially, the drawbacks of the state of the art and are at the same time easy and cost-effective to implement.

According to the present invention, there are provided a micro-fluidic system and a process for its production according to the following independent claims and, preferably, according to any of the claims directly or indirectly dependent on the independent claims.

Unless otherwise explicitly specified, the following terms have the following meaning in the following text.

By equivalent diameter of a section there is intended the diameter of a circle having the same area of the section.

By section of a channel or of a duct there is intended the section substantially perpendicular to the longitudinal extension of the channel (or duct) i.e. to the feeding direction of the fluid in the channel (or duct).

By equivalent diameter of a hole there is intended the diameter of a circle having the same area as the smallest cross section of the hole.

By micro-fluidic system there is intended a system comprising at least one micro-fluidic channel and a valve arranged along the channel.

By microfluidic channel there is intended a channel having a section with at least one dimension (in particular, the height) smaller than 1 mm (more precisely, from 10 µm to 0.5 mm).

BRIEF DESCRIPTION OF THE DRAWINGS

The invention will now be described with reference to the accompanying drawings, which show non-limitative embodiments thereof, in which:

FIGS. 3 and 4 show details of the section of FIG. 2 in two different operative configurations; and FIG. 5 shows what has been shown in FIG. 2 with the addition and the elimination of some details.

BEST MODE FOR CARRYING OUT THE INVENTION

Figure 2:
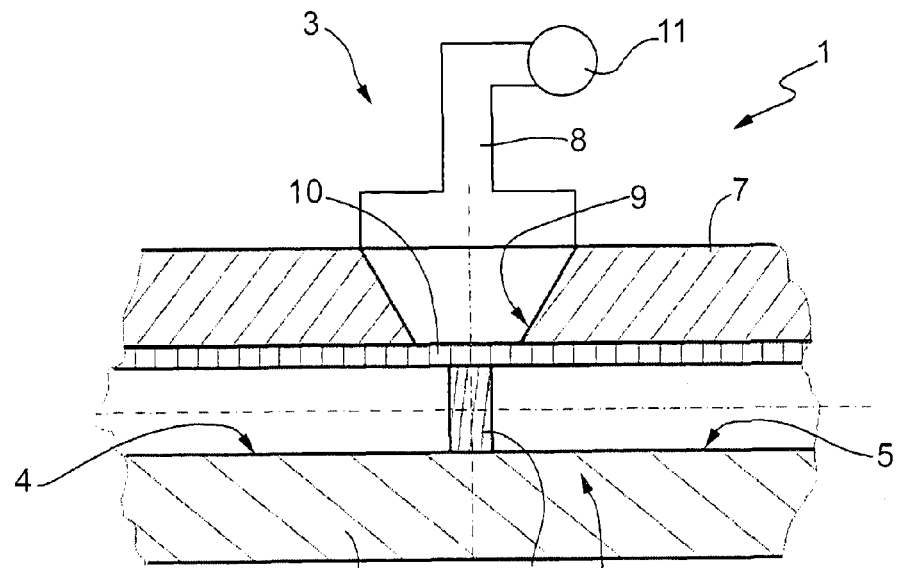
FIG. 2 is a cross section along plane II-II of the microfluidic system of FIG. 1.
Figure 1:
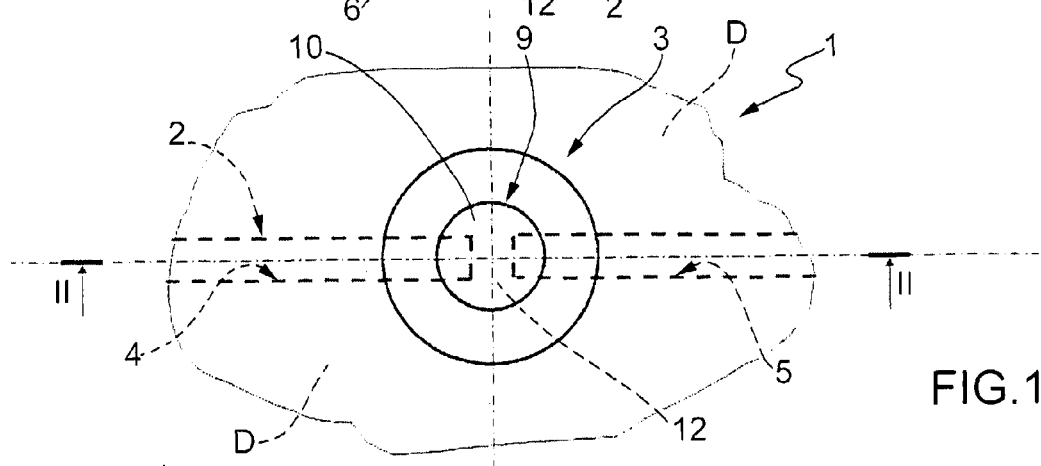
FIG. 1 is a diagrammatic top view of a micro-fluidic system made according to the present invention.

In FIGS. 1 and 2, numeral 1 indicates as a whole a microfluidic system comprising a micro-fluidic channel 2 and a valve 3, which is adapted to adjust the transfer of fluid (in particular of liquid) from a segment 4 to a segment 5 (and/or vice versa) of channel 2.

System 1 comprises a support wall 6, which serves as bottom wall of channel 2; and a covering wall 7, which serves as a top wall of channel 2. Walls 6 and 7 face each other. More precisely, walls 6 and 7 are reciprocally substantially parallel.

In particular, system 1 comprises a spacer element D (partially shown—see also FIG. 5), which is arranged in contact with wall 6 between wall 7 and wall 6. Spacer D sealingly connects walls 6 and 7.

Spacer element D delimits channel 2 laterally (and at the ends). More in particular, spacer element D (FIG. 2) comprises two side portions which extend, parallelly to the plane of the sheet of FIG. 2, so as to sealingly connect walls 6 and 7 and laterally delimit channel 2. According to some embodiments, the above mentioned spacer element D comprises two end holes, which are arranged at opposite ends (one of which is shown on the left of FIG. 5) of channel 2 and are adapted to connect channel 2 with further ducts/channels (not shown) of system 1 or with the external environment.

Wall 7 has a hole 9, which is arranged between segments 4 and 5. According to some embodiments, wall 7 comprises two holes (one of which is shown on the left of FIG. 5), which are arranged at opposite ends of channel 2 and are adapted to connect channel 2 with further ducts/channels (not shown) of system 1 or with the external environment.

According to some embodiments, wall 6 is made of silicon. Wall 7 is made of glass. Spacer element D is made of photoresist material.

According to other embodiments, support 6, wall 7 and spacer element D may be of materials other than those indicated above.

Channel 2 has a section with at least one dimension (in particular, the height) smaller than 1 mm (more precisely, from 10 µm to 0.5 mm).

In particular, channel 2 has a section with an equivalent diameter up to 0.5 mm (specifically from 10 µm). According to some embodiments, the section of channel 2 is substantially constant. According to alternative embodiments, the section of channel 2 is variable.

Hole 9 has a diameter from 100 µm to 1 mm. Advantageously, hole 9 has an equivalent diameter from 200 µm to 1 mm. According to some embodiments, hole 9 has an equivalent diameter smaller than 0.5 mm.

The dimensions of the channels or ducts or holes or thicknesses may be measured in a standard manner with profilometers.

According to some embodiments, hole 9 has a shape selected from the group consisting of: substantially frusto-conical, substantially frusto-pyramidal, substantially parallelepipedal, substantially cylindrical. In the embodiment shown, hole 9 has a substantially frusto-conical shape.

Valve 3 includes a closing element 10 comprising, in turn, (in particular, consisting of) a photoresist material; and an actuator 11, which is adapted to displace closing element 10 between a locked position (shown in FIG. 3) and an open position (shown in FIG. 4).

According to the embodiment shown, actuator 11 is a fluid-dynamic actuator (in particular a pneumatic actuator). Advantageously, in these cases, actuator 11 comprises a suction system, specifically a pump.

According to some embodiments, actuator 11 is sealingly connected to hole 9 by means of a duct 8.

According to some embodiments, actuator 11 is a mechanical actuator. In this case, actuator 11 is adapted, when operated, to push closing element 10 in a locked position by means of a piston (not shown). In these cases, advantageously, in use, when actuator 11 is not in use (therefore it does not exert any force on closing element 10) closing element 10 is in an open position.

Advantageously, closing element 10 is arranged within microfluidic channel 2 in contact with wall 7 so as to close hole 9 with respect to microfluidic channel 2. In particular, closing element 10 extends in contact with an inner surface (i.e. the surface facing wall 6) of wall 7 so as to delimit the microfluidic channel 2 (on top) (in the area of valve 3).

According to some embodiments, closing element 10 is connected to the inner surface of wall 7. Element D is (sealingly) connected to the inner surface of wall 6.

Referring in particular to FIG. 5, channel 2 comprises at least one area 14 (specifically two areas), in which closing element 10 is absent. In this area 14 wall 7 delimits channel 2 (i.e. there is a hole 15).

In particular, when channel 2 comprises a separation chamber 16 (such as, for example, disclosed in one of patent applications PCT/IB2010/000615, PCT/IB2010/000580, PCT/IB2010/000585), closing element 10 (and also spacer element D) is absent in the area of chamber 16. Spacer element D partially delimits chamber 16 (in particular laterally). Wall 7 delimits chamber 16 on top.

According to some embodiments, separation chamber 16 comprises a dielectrophoresis system.

Advantageously, the dielectrophoresis system and/or its operation are as disclosed in at least one of patent applications WO0069565, WO2007010367, WO2007049120.

Spacer element D is absent in the area of area 14.

It should be noted that segments 4 and 5 each have a section with an equivalent (constant) diameter up to 0.5 mm (specifically 10 µm). Chamber 16 has (at least) one section with (at least) one dimension (in particular width) which is at least twice the equivalent diameter of segments 4 and 5. In particular, chamber 16 has (at least) one section with (at least) one dimension (in particular width) of at least 5 mm.

According to some embodiments, closing element 10 has a thickness from 5 µm to 50 µm, advantageously between 5 µm and 30 µm.

According to some embodiments, closing element 10 may consist of a single photoresist material or of a combination (for example a mixture) of several different photoresist materials. In particular, closing element 10 is made of a single photoresist material.

By photoresist material there is intended a material obtained from an electromagnetic radiation sensitive material (in particular, in the range of visible light and infrared) and which, if exposed to this electromagnetic radiation, may become soluble (in this case the photoresist material is a positive photoresist) or insoluble (in this case the photoresist material is a negative photoresist) in specific solvents (usually designated developer photoresists).

According to some embodiments, the photoresist material is a negative photoresist.

Advantageously, the photoresist material (of closing element 10) has an elastic modulus from 2500 KPa to 4000 KPa.

According to some embodiments, the photoresist material is selected from the group consisting of: acrylic polymer, polymethylglutarimide, at least partially crosslinked SU-8 and a mixture of diazonaphthoquinone with a phenolformaldehyde. In particular, the photoresist material is selected from the group consisting of: acrylic polymer, at least partially crosslinked SU-8.

Advantageously, the photoresist is of the dry-resist type. Thereby, it may be directly laminated on wall 7, forming closing element 10 without pouring in hole 9.

Instead, when a liquid photoresist (for example, SU8) is used, the photoresist may be prevented from pouring and thickening in hole 9 (as closing element 10 would lose its elasticity, as it is no longer substantially a membrane), by operating as follows:

i. one mould with protrusions complementary to holes 9 is coupled on the perforated wall;

ii. the resist liquid is distributed by spin-coating on face 5 of the slice of substrate 7 (which at this point has the holes blocked by the mould);

iii. a step of pre-baking is performed so as to increase the viscosity of the material forming the closing element;

iv. finally the photopolymerisation is performed as provided in the standard procedure with dry resist.

In the present text, by acrylic polymer there is intended a polymer obtained by the polymerisation of at least one acrylic monomer. In particular, by acrylic polymer there is intended a polymer obtained by the polymerisation of an acrylic monomer.

The acrylic monomer is selected from alkyl esters of acrylic acid or of methacrylic acid, in which in particular the alkyl has one to six carbon atoms.

According to some embodiments, the acrylic monomer is selected from the group consisting of: methylmethacrylate (MMA), ethylmethacrylate, propylmethacrylate, buthylmethacrilate, methylacrilate, ethylacrilate, buthylacrilate. Advantageously, the acrylic monomer is selected from the group consisting of: methylacrylate, ethylacrilate, butylacrilate. In particular, the acrylic polymer is a polymethylacrilate.

Advantageously, the acrylic polymer is crosslinked.

Advantageously, micro-fluidic system 1 further comprises a partition 12, which is arranged within channel 2 between segments 4 and 5. Partition 12 is adapted to separate segments 4 and 5 from one another. Partition 12 is (sealingly) connected to the inner surface of wall 6.

When closing element 10 is in a locked configuration (FIG. 3), closing element 10 is adapted to cooperate with (in particular is in contact with) partition 12 to sealingly isolate segment 4 with respect to segment 5. In particular, in the locked configuration, closing element 10 is adapted to close on top the open ends of segments 4 and 5. When closing element 10 is in an open configuration (FIG. 4), partition 12 and closing element 10 are spaced from one another, and the fluid (in particular the liquid) may pass from segment 4 to segment 5 (or vice versa) "overcoming" partition 12.

According to some advantageous embodiments, partition 12 is connected (in particular is integral) with spacer element D. Advantageously, (therefore) spacer element D and partition 12 are made of the same material. In particular, partition 12 comprises (in particular, is made of) a photoresist material. Advantageously, partition 12 and spacer element D have the same thickness (i.e. the extension from wall 6 to wall 7).

Advantageously, closing element 10 is curved in the area of hole 9 and, in particular, so as to partially extend within hole 9. More in particular, closing element 10 is curved in the area of hole 9 so as to have a convexity facing inside hole 9 (i.e. a concavity opposite to hole 9). In other words, in a resting condition (i.e. without any pressure being exerted), closing element 10 takes a shape similar to that shown in FIG. 4.

According to some embodiments, micro-fluidic system 1 further comprises a control unit (not shown) adapted to adjust the operation of actuator 11.

Advantageously, in use, actuator 11 exerts a positive pressure on closing element 10 so as to push closing element 10 against partition 12 (FIG. 3). In this manner the sealing between closing element 10 and partition 12 is improved.

When segments 4 and 5 are to be connected, the operation of actuator 10 is inverted. Actuator 10 (therefore) exerts a negative pressure (suction) on closing element 10 so as to deform closing element 10 and separate it from partition 12. Thereby, segments 4 and 5 are connected to one another.

Micro-fluidic system 1 according to the present invention may be incorporated without substantial difficulties within complex micro-fluidic circuits. In this connection, it should be noted that micro-fluidic system 1 has relatively small dimensions and does not require particular elements that are not suitable to be inserted in complex micro-fluidic circuits.

According to another aspect of the present invention, a process is provided for the preparation of a micro-fluidic system 1 as defined above.

The process comprises a step of applying a first electromagnetic radiation sensitive material to wall 7. The process also comprises a step of irradiating, during which the first electromagnetic radiation sensitive material is partially irradiated with electromagnetic radiation. The first electromagnetic radiation sensitive material is a photo-polymer (i.e. a photopolymerisable material).

During the step of irradiating, the photo-polymer is irradiated with electromagnetic radiation so that the photo-polymer polymerises (i.e. solidifies) at least partially (i.e. in some areas) so as to obtain closing element 10.

The process also comprises a step of removing, during which part of the first electromagnetic radiation sensitive material is removed (with a solvent) so as to obtain closing element 10.

Advantageously, the steps of applying and irradiating are performed so that closing element 10 is curved in the area of hole 9 and, in particular, so as to partially extend within hole 9. More in particular, closing element 10 is curved in the area of hole 9 so as to have a concavity opposite to hole 9 (i.e. a convexity facing inside hole 9).

This results especially advantageous as it reduces the risk that closing element 10 and partition 12 are connected during a step of overlapping (above disclosed).

The process also comprises a step of overlapping, during which wall 7 provided with closing element 10 is overlapped to wall 6 and connected to wall 6. In particular, wall 7 and wall 6 are overlapped so that closing element 10 is arranged therebetween. In addition or as an alternative, wall 7 and wall 6 are overlapped so that spacer element D is arranged therebetween. In addition or as an alternative, wall 7 and wall 6 are overlapped so that partition 12 is arranged therebetween.

More in particular, wall 7 and wall 6 are connected to one another by applying pressure and providing heat.

According to some embodiments, the process also comprises a further step of applying, during which a second electromagnetic radiation sensitive material is applied to further wall 6. The further step of applying at least partially precedes the step of overlapping.

The process also comprises a step of treating, during which the second electromagnetic radiation sensitive material is partially subjected to electromagnetic radiation and therefore is partially removed (by means of solvent). The step of treating at least partially follows the further step of applying and at least partially precedes the step of overlapping.

The second electromagnetic radiation sensitive material is (partially) removed so as to obtain spacer element D.

In addition or as an alternative the second electromagnetic radiation sensitive material is (partially) removed so as to obtain partition 12.

Spacer element D is arranged between wall 7 and wall 6 during the step of overlapping. In addition or as an alternative, partition 12 is arranged between wall 7 and wall 6 during the step of overlapping.

The (first or second) electromagnetic radiation (in particular, in the range of visible light or infrared) sensitive material is a material which, if exposed to these electromagnetic radiations, may become soluble (in this case the photoresist material is a positive photoresist) or insoluble (in this case the photoresist material is a negative photoresist) in specific solvents (usually designated developer photoresists). Advantageously, the second electromagnetic radiation sensitive material is a photo-polymer.

According to some embodiments, the photo-polymer is selected from the group consisting of: at least partially polymerisable acrylic material, polymethylglutarimide, crosslinkable SU-8 and a mixture of diazonaphthoquinone with a phenolformaldehyde resin.

According to specific embodiments, the photo-polymer is an at least partially polymerisable acrylic material, in particular it comprises (more particularly is) a mixture of an acrylic monomer, an acrylic polymer and a photo initiator. More in particular, the photo-polymer comprises a cross-linker.

According to some embodiments, the cross-linker has at least two acrylic residues.

According to some embodiments, the photo-initiator is selected from the group consisting of: camphoroquinone, phenylpropanedione, AIBN (azobisisobutyronitrile), benzoyl peroxide, DMPA (dimethoxy-phenylacetophenone). In particular, the photo-initiator is selected from the group consisting of: camphoroquinone, phenylpropanedione, DMPA (dimethoxy-phenylacetophenone). According to specific embodiments, the photo-initiator is camphoroquinone (CQ).

According to specific embodiments, the photo-polymer is Dryresist Ordyl SY300 of Elga Europe.

According to some embodiments, the second electromagnetic radiation sensitive material is selected from the group consisting of: at least partially polymerisable acrylic material, polymethylglutarimide, crosslinkable SU-8 and a mixture of diazonaphthoquinone with a phenolformaldehyde resin.

According to specific embodiments, the second electromagnetic radiation sensitive material is an at least partially polymerisable acrylic material, in particular it comprises (more particularly is) a mixture of an acrylic monomer, an acrylic polymer and a photo-initiator. More in particular, the electromagnetic radiation sensitive material comprises a crosslinker.

According to some embodiments, the cross-linker has at least two acrylic residues.

According to some embodiments, the photo-initiator is selected from the group consisting of: camphoroquinone, phenylpropanedione, AIBN (azobisisobutyronitrile), benzoyl peroxide, DMPA (dimethoxy-phenylacetophenone). In particular, the photo-initiator is selected from the group consisting of: camphoroquinone, phenylpropanedione, DMPA (dimethoxy-phenylacetophenone). According to specific embodiments, the photo-initiator is camphoroquinone (CQ).

According to specific embodiments, the second electromagnetic radiation sensitive material is Dryresist Ordyl SY300 of Elga Europe.

Advantageously, the photo-polymer and the second electromagnetic radiation sensitive material comprise (in particular, consist of) the same material.

The process according to the present invention results especially simple, fast and cost-effective. In this connection, it should be noted that this process does not require the introduction of further elements such as elastomeric membranes which are hardly insertable and connectable correctly with other components.

System 1 according to the present invention may advantageously be used in an apparatus for separating particles as an example disclosed in one of the following Italian patent applications and patent applications claiming the priority thereof: BO2009A000152, BO2009A000153, BO2009A000154, BO2009A000155.

Unless explicitly indicated otherwise, the content of the references (papers, texts, patent applications etc.) cited in this text is herein incorporated by way of completeness of description. In particular, the above mentioned references are herein incorporated by reference.

Further features of the present invention will result from the following disclosure of an embodiment of micro-fluidic system 1 given by mere way of non-limitative illustration.

EXAMPLE

This example discloses the production of micro-fluidic system 1.

A layer Dryresist (in particular Ordyl SY300, Elga Europe) (thickness 90 µm) was laminated at a 90° angle on support 6 of silicon (thickness 600 µm). The layer of Dryresist was then partially protected by a photolithographic mask (a transparent slide printed with a resolution of 24000 DPI) and subjected to UV radiation (150 W) for 15 seconds so that the areas of the Dryresist layer which are exposed (i.e. not covered by the dark parts of the mask) polymerise. Once polymerisation was selectively performed, the non polymerised part was removed by dipping laminated substrate 6 in a developer (BMR developer—mixture of xylene, 2-butoxyethylacetate, mixture of isomers).

At this point, wall 6 with corresponding spacer element D obtained thereby was heated in an oven at a temperature of 50° C. for 1 hour to obtain drying.

A glass layer of wall 7 (thickness 500 µm) was obtained by milling. Hole 9 and end holes (not shown) have a frusto-conical shape with the lower part having a diameter of 700 µm and the top part having a diameter of 1200 µm.

A layer of Dryresist (in particular Ordyl SY300, Elga Europe) (thickness 30 µm) was laminated at a 90° angle on the above mentioned glass layer (FIG. 14). In particular, the lamination was performed by applying the Dryresist to a surface facing the top part of the glass layer.

The Dryresist was then subjected (by maintaining the Dryresist facing upwards) to UV radiation (150 W) for 15 seconds so as to polymerise. Once polymerisation was performed, the non polymerised part was removed by dipping wall 7 in a developer (BMR developer—mixture of xylene, 2-butoxyethylacetate, mixture of isomers). Thereby, closing element 10 is obtained curved in the area of hole 9 (in particular so as to partially extend within hole 9).

Subsequently, wall 7 was pressed against wall 6 for 80 minutes at a temperature of 95° C. to obtain a thermal bond between the two layers of Dryresist.

The invention claimed is:

1. A micro-fluidic system comprising at least one micro-fluidic channel (2), which has a first segment (4), at least one second segment (5) and at least one wall (7), which is provided with at least one hole (9) arranged between the first and the second segment (4, 5); and at least one valve (3), which is arranged along the micro-fluidic channel (2) in the area of the hole (9) and comprises an actuator (11) and a closing element (10); the actuator (11) is adapted to displace the closing element (10) between a locked configuration, in which the closing element (10) substantially isolates the first and the second segment (4, 5) from one another, and an open configuration, in which the first and second segment (4, 5) are connected to one another; the closing element (10) being arranged within the micro-fluidic channel (2) in contact with said wall (7) and so as to close the hole (9) with respect to the micro-fluidic channel (2); the micro-fluidic system (1) being characterised in that the closing element (10) comprises a photoresist material; the micro-fluidic channel (2) comprising a further wall (6); the system (1) comprising at least one spacer element (D), which is arranged in contact with the further wall (6), at least partially delimits the channel (2) and comprises a photoresist material.

2. The system according to claim 1, wherein the closing element (10) is made of a photoresist material; the spacer element (D) is made of a photoresist material and is arranged between the wall (7) and the further wall (6).

3. The system according to claim 1, wherein the micro-fluidic channel (2) comprises at least one area, in the area of which the closing element (10) is absent so as to expose at least part of an inner surface of the wall (7); the channel (2) has a section with at least one dimension smaller than 0.5 mm.

4. The system according to claim 1, wherein the photoresist material is a negative photoresist.

5. The system according to claim 1, wherein the closing element (10) has an elastic modulus from 2500 KPa to 4000 KPa.

6. The system according to claim 1, wherein the photoresist material is selected from the group consisting of: acrylic polymer, polymethylglutarimide, SU-8 and a mixture of diazonaphthoquinone with a phenolformaldehyde.

7. The system according to claim 1, wherein the photoresist material is cross-linked.

8. The system according to claim 1, comprising a partition (12) arranged within the micro-fluidic channel (2), between the first and the second segment (4, 5).

9. The system according to claim 8, wherein the partition (12) comprises, in particular consists of, a photoresist material.

10. The system according to claim 9, wherein the closing element (10) is curved in the area of the hole (9) so that, when the actuator (11) exerts no pressure, the closing element (10) is separate from the partition (12).

11. The system according to claim 1, wherein the micro-fluidic channel (2) has a section with an equivalent diameter greater than 10 µm.

12. The system according to claim 1, wherein the closing element (10) has a thickness from 5 µm to 30 µm.

13. A process for producing a system according to claim 1, comprising a step of applying a first electromagnetic radiation sensitive material to the wall (7); a step of irradiating, during which the first electromagnetic radiation sensitive material is partially irradiated with electromagnetic radiation; a step of removing, during which part of the first electromagnetic radiation sensitive material is removed so as to obtain the closing element (10); a step of overlapping, during which the wall (7) provided with the closing element (10) and a further wall (6) are overlapped to one another and connected to one another; a further step of applying, which precedes the step of overlapping and during which a second electromagnetic radiation sensitive material is applied to the further wall (6); a step of treating, which follows the further step of applying and precedes the step of overlapping and during which the second electromagnetic radiation sensitive material is partially subjected to electromagnetic radiation and then partially removed so as to obtain the spacer element (D).

14. The process according to claim 13, wherein the partition (12) is obtained during the step of treating.

15. The process according to claim 13, wherein the wall (7) and the further wall (6) are overlapped so that the closing element (10) and the spacer element (D) are arranged therebetween.

16. The process according to claim 13, wherein the wall (7) and the further wall (6) are connected to one another by applying a pressure and providing heat.

17. The process according to claim 13, wherein the first and the second electromagnetic radiation sensitive material comprise the same material.

* * * * *